United States Patent
Yang et al.

(10) Patent No.: US 9,722,673 B2
(45) Date of Patent: Aug. 1, 2017

(54) INTERLEAVED COIL AND FERRITE CONFIGURATION TO FACILITATE NEAR FIELD COUPLING

(75) Inventors: Songnan Yang, San Jose, CA (US); Emily B. Cooper, Portland, OR (US); Ronald W. Gallahan, Portland, OR (US); Adam D. Rea, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 13/976,078

(22) PCT Filed: Dec. 21, 2011
(Under 37 CFR 1.47)

(86) PCT No.: PCT/US2011/066455
§ 371 (c)(1),
(2), (4) Date: Nov. 20, 2014

(87) PCT Pub. No.: WO2013/095428
PCT Pub. Date: Jun. 27, 2013

(65) Prior Publication Data
US 2016/0119036 A1    Apr. 28, 2016

(51) Int. Cl.
*H04B 5/00* (2006.01)
*H01Q 1/24* (2006.01)
*H01Q 7/06* (2006.01)

(52) U.S. Cl.
CPC ........... *H04B 5/0081* (2013.01); *H01Q 1/243* (2013.01); *H01Q 7/06* (2013.01); *H04B 5/0037* (2013.01); *H04B 5/0031* (2013.01)

(58) Field of Classification Search
CPC .......... H01Q 7/00; H01Q 1/2225; H01Q 1/22; H01Q 1/28
USPC ................ 343/788, 787, 895; 455/41.1, 41.2
See application file for complete search history.

(56) References Cited

U.S. PATENT DOCUMENTS

| | | | |
|---|---|---|---|
| 7,973,722 B1 * | 7/2011 | Hill | H01Q 7/08 343/702 |
| 2006/0028384 A1 * | 2/2006 | Akiho | G06K 7/0008 343/742 |
| 2007/0171079 A1 | 7/2007 | Saito et al. | |
| 2009/0021212 A1 | 1/2009 | Hasegawa et al. | |
| 2009/0121835 A1 * | 5/2009 | Borret | G06K 7/0008 340/10.1 |
| 2011/0257703 A1 | 10/2011 | Kerber et al. | |

(Continued)

FOREIGN PATENT DOCUMENTS

WO    2013/095428 A1    6/2013

OTHER PUBLICATIONS

International Preliminary Report on Patentability and Written Opinion received for PCT Patent Application No. PCT/US2011/066455, mailed on Jul. 3, 2014, 8 pages.

(Continued)

*Primary Examiner* — Dameon E Levi
*Assistant Examiner* — David Lotter
(74) *Attorney, Agent, or Firm* — Schiff Hardin LLP

(57) ABSTRACT

Described herein are techniques related to near field coupling (e.g., wireless power transfers (WPF) and near field communications (NFC)) operations among others. This Abstract is submitted with the understanding that it will not be used to interpret or limit the scope or meaning of the claims.

23 Claims, 6 Drawing Sheets

(56) References Cited

U.S. PATENT DOCUMENTS

2012/0038443 A1\* 2/2012 Kubo ................. G06K 7/10336
  336/90
2013/0286583 A1\* 10/2013 Walsh ................... H02J 7/0042
  361/679.55

OTHER PUBLICATIONS

International Search Report and Written Opinion received for PCT Patent Application No. PCT/US2011/066455, mailed on Sep. 17, 2012, 12 pages.

\* cited by examiner

INTERLEAVED COIL AND FERRITE CONFIGURATION TO FACILITATE NEAR FIELD COUPLING

BACKGROUND

Recently, technologies have arisen that allow near field coupling (such as wireless power transfers (WPT) and near field communications (NFC)) between electronic devices in close proximity to each other and more particularly, thin portable electronic devices. Both near field coupling functions use radio frequency (RF) antennas in each of the devices to transmit and receive electromagnetic signals. Because of user desires (and/or for esthetic reasons) many of these portable devices are small, are becoming smaller as markets evolve, and have exaggerated aspect ratios when viewed from the side (i.e., they are "thin"). As a result, many of these thin devices incorporate flat antennas which use coils of conductive material as their radiating (or radiation receiving) antennas for use in near field coupling functions.

However, the small form factor of many devices interferes with the ability of the coils to couple. For instance, objects within the devices and near the coils might divert the flux of the magnetic field away from the coils. Notably, metallic objects tend to divert magnetic flux around themselves and, thus, away from the coils. Moreover, it might be the case that users want to transfer power and/or communicate using the devices without generating a strong magnetic field. Instead, users might prefer to use the often-limited onboard power of these devices to affect other functions (for instance, placing phone calls, receiving phone calls, accessing data over RF wide area networks such as the Internet, etc.).

In addition, users tend to prefer to hold certain devices and/or to set them down in certain orientations. For instance, some devices provide NFC functions by "bumping" the backs of two devices together. This back-to-back bumping is intended to place the coils in the two devices in close proximity to each other and in such a relative orientation that the coils couple relatively well. In some cases the location, shape, etc. of the two coils correspond to each other relatively closely during back-to-back bumps. Yet, for ergonomic reasons, users holding these devices might find it awkward to hold them in an orientation suitable for back-to-back bumping. In other instances, users might wish to affect WPT between the devices while using (or having available for use) one or both devices. Thus, to perform WPT from a laptop computer to a cellular telephone (for instance) users often do not wish to lay the cellular telephone on top of the keyboard of the laptop device (where the relative orientation and proximity of the coils facilitates their coupling). In many cases, users instead prefer to orient the devices involved in a side-by-side configuration. In other words, users often want to bump one side of one device to a side of another device in NFC scenarios and want to leave one device next to another in lengthier WPT scenarios, which often require some time to occur.

Unfortunately, with many small form factor (and, more specifically, "thin") devices, side-by-side device orientations limit the ability of the coils in the devices to couple. In such relative orientations, the coils might be rather distant from one another and/or one coil might sense only the field generated at the edge of the other coil. Thus, placing such devices side-by-side might limit the rate at which WPT occurs because the portion of the field which the receiving coil happens to be in is so weak (or the relative orientation of the flux is such) as to limit the coupling of the receiving antenna with the magnetic field. In NFC scenarios, the bit rate associated with the communication can be similarly limited by the weak coupling of the coils. Similar considerations also apply to the transmitting coil and its ability to propagate the field in the presence of tightly integrated objects within the transmitting device. Yet users desire WPT and NFC functionality in an increasing number (and variety) of thin devices and they desire those functions with side-by-side operability.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for coupling antennas of devices and more particularly for coupling coil antennas of thin portable electronic devices for (among other uses) improving near field coupling capabilities of the devices. In particular, this document discloses an interleaved coil and ferrite configuration to facilitate near field coupling capabilities of the devices. Near field coupling includes (by way of illustration and not limitation) wireless power transfer (WPT) and/or near field communications (NFC) capabilities of the devices.

Figure 1A:
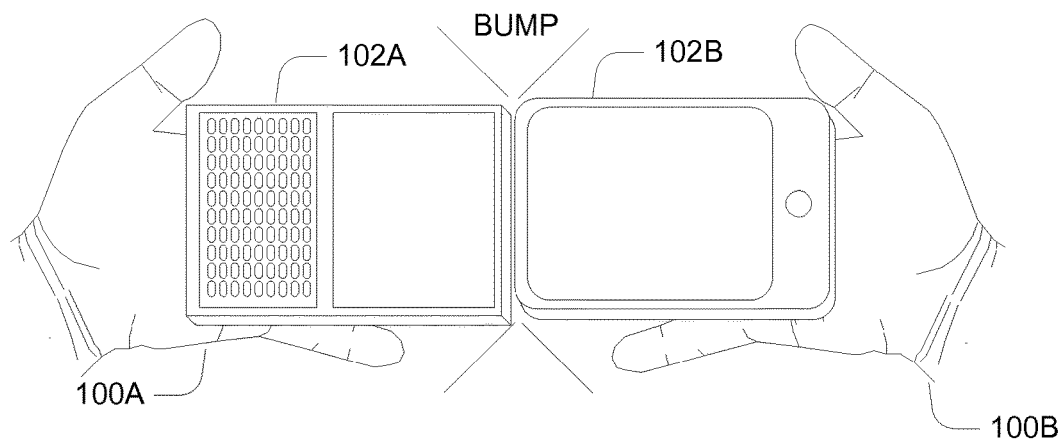
FIGS. 1A and 1B illustrate perspective views of various devices in differing exemplary near field coupling arrangements.
Figure 1B:
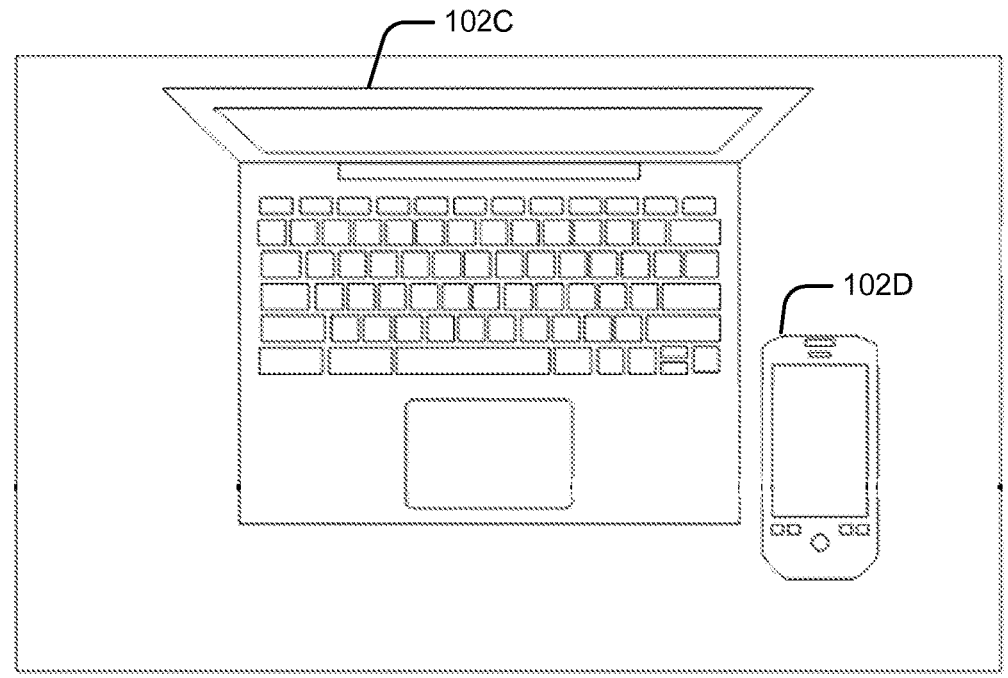

FIGS. 1A and 1B illustrate perspective views of various devices in differing near field coupling arrangements. More particularly, many users have a desire to operate near field coupling enabled portable electronic devices and/or other devices in certain ergonomically convenient manners. Examples of such device include (but are not limited to) phones, cellular phones, smart phones, personal digital assistants, tablet computers, netbook computers, laptop computers, ultrabook computers, and various potentially wireless devices such as pointing devices (mice), keyboards, wireless disks, and the like.

For example, FIG. 1A shows a so-called "NFC bump" where two users 100A and 100B "bump" their NFC-enabled devices 102A and 102B together in an edge-to-edge or head-to-head manner to perform NFC-related information sharing functions. With conventional NFC-enabled devices, the near field coupling would be inefficient or ineffective because of reasons discussed in the Background section. In addition, FIG. 1B shows an often desired side-by-side arrangement of devices (such as laptop 102C and smartphone 102D) for NFC and/or WPT purposes. However, the mechanical integration of near field coupling components in conventional devices constrains the ability of users to effectively employ these desired arrangements. With reference to at least these constraints and/or others, exemplary implementations described herein free users to operate devices as they desire.

Figure 2:
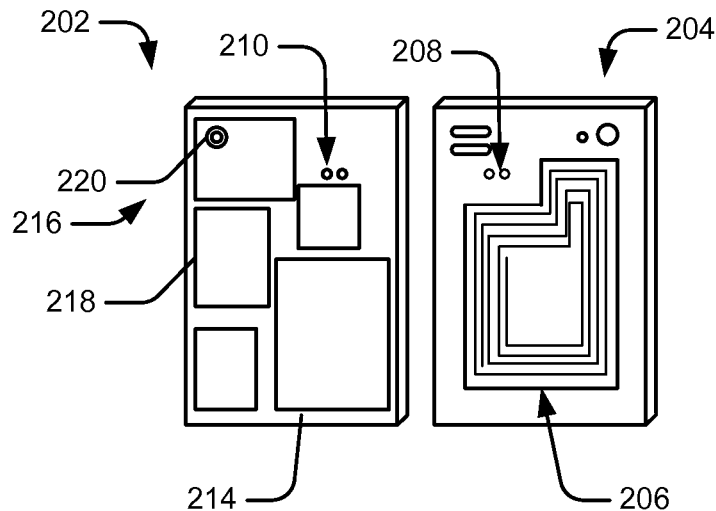
FIG. 2 illustrates a top plan view of a partially disassembled device.

FIG. 2 illustrates a top plan view of a partially disassembled device. The emerging technologies related to near field coupling enable many appealing experiences for users of portable electronic devices. Providers of these devices typically include flat coil antennas in their design so that (in part) the devices can possess the thin aspect ratios and small form factors often sought by users. Moreover, these flat coil antennas allow for mechanical integration into these thin devices with comparative ease (when considering mechanical factors in isolation from other considerations such as the ability of the coils of different devices to couple with one another). For instance, integrating a flat printed circuit board (PCB), which incorporates a coil antenna, into a thin device usually minimizes the increase in the thickness of the device 202 due to the antenna itself.

With continuing reference to FIG. 2, the drawing illustrates a device 202 with its back cover 204 removed (and shown with its inside up). In the current embodiment, the device 202 happens to be a smart phone. However, the device 202 could be any of the variety of available portable electronic devices. With the back cover 204 removed, FIG. 2 illustrates an antenna of this particular device 202 mounted on, embedded in, or otherwise associated with the back cover 204. In the current embodiment the antenna happens to include a flat coil 206 and a pair of contacts 208 which are in electrical communication with the coil 206 and which positioned to electrically communicate with a corresponding pair of contacts 210 on a chassis 212 of the device 202 (shown face down).

FIG. 2 also illustrates that within the chassis 212 of the device 202, the device 202 includes a battery 214, and other metallic components 216 (or components including metallic structures) such as a printed circuit board (PCB) 218, a camera 220, etc. As is disclosed further herein with reference to at least FIG. 3B, when the back cover 204 is placed on the chassis 212, it places the coil 206 in electrical communication with other functional components of the device 202. However, it also places the coil 206 in close proximity to some or all of the metallic components 216 (such as the battery 214). Of course, other device 202 configurations are within the scope of the disclosure. For instance, the coil 206 could be on the chassis 212 instead of the back cover 204. In many devices 202 the metallic components 216 deflect the flux of magnetic fields (that might otherwise couple with the coil 206) away from the coil 206.

As a result, when users attempt to perform near field coupling (e.g., WPT and/or NFC) functions between conventional devices, the presence of the metallic components 216 and the relative orientation and distance between the coils 206 inhibits the ability of the coils 206 to couple with the coils of the other device. In turn, the inability of the coils 206 to couple efficiently in conventional scenarios limits the ability to perform near field coupling (e.g., WPT and/or NFC) functions with these devices 202. Accordingly, users cannot use conventional devices in many desired ways or must accept the back-to-back operability limitations of the conventional devices.

With reference again to FIGS. 1A and 1B, the drawing illustrates ways in which the users would like to use the devices 102. In general, users 100A and 100B desire to bump devices 102A and 102B along the sides as illustrated by FIG. 1A. However, due to the constraints imposed on the relative orientation of conventional devices during the bump by the inability of the coils 206 to couple efficiently, users often find that they must bump the conventional devices along their respective backs to enable NFC functions. For some devices such as cellular telephones, this might be ergonomically feasible. However, for other devices (for instance, tablets) it might not be practicable. In contrast, side-to-side bumping (as shown in FIG. 1A) of devices 102A and 102B allows users 100A and 100B to hold the devices 102A and 102B in ergonomically desirable manners.

Moreover, users often desire to cause WPT functions to occur by placing devices side-by-side with other devices as illustrated in FIG. 1B. In contrast, the inability of the coils 206 to couple efficiently with conventional devices forces users to place such devices on the top of another device (perhaps a charging mat) to cause a WPT function to occur. In some cases, as with a smart phone, users would find it inconvenient to place one device on top of another device (like a laptop computer). Instead, users often prefer placing devices side-by-side so that their sides (as shown in FIG. 1B) are generally proximate to one another. In such situations, the side-by-side placement of devices 102C and 102D allow users to use both devices even while WPT functions might be occurring.

Various embodiments described herein allow users to bump devices side-to-side and to place devices side-by-side for near field coupling functions (such as NFC and WPT) by improving the coupling between the coils 206 of one or more of such devices. More specifically, embodiments provide devices with strategically shaped, and placed, ferrite materials, which provide for better coupling of coils 206. Devices of the current embodiment therefore enable new uses of devices 102 in regard to WPT, NFC, and other near field coupling functionality.

As disclosed further herein, devices that implement near field coupling-related functions use the coupling achieved by the coils 206 in those devices. Each of these coils 206 has an inductance associated with it, which can be chosen in conjunction with the resistive, capacitive, and other features of devices 202 to enable a common resonant frequency for the devices 202. In such systems, the transmission efficiency n of power transfers from the transmitting coil 206 to the receiving coil 206 is often described in terms of the quality factors Q of each of the coils and a coupling coefficient k associated with the overall system.

More specifically, Equation 1 describes one such relationship:

$$n = \left(1 - \frac{1}{kQ}\right)^2 \quad \text{Equation 1}$$

Where:

$$Q = SQRT(Q_{TX} Q_{RX})$$

$$Q_{TX,RX} = wL_{TX,RX} / R_{TX,RX}$$

and TX indicates the transmitting coil, RX indicates the receiving coil, k is a coupling coefficient, and w is a frequency of interest.

Often, in small and/or thin devices 202, mechanical volume constraints restrict the size, shape, etc. of the transmitting and receiving coils 206. For instance, FIG. 2 illustrates that coil 206 deviates from its otherwise generally oblong shape near its upper, left corner. Moreover, the sidebands generated during NFC functions complicate the design of the transmitting and receiving coils 206 further by increasing the range of frequencies associated with those sorts of functions. As a result, the quality factors $Q_{TX}$ and $Q_{RX}$ of the transmitting and receiving coils 206, as well as the system level quality factor Q, might not be optimized for either WPT functions, NFC functions, or both types of functions. Thus, electrical designers of such devices 202 sometimes find that they have little ability to influence the various quality factors $Q_{TX}$, $Q_{RX}$, and Q.

Figure 3A:
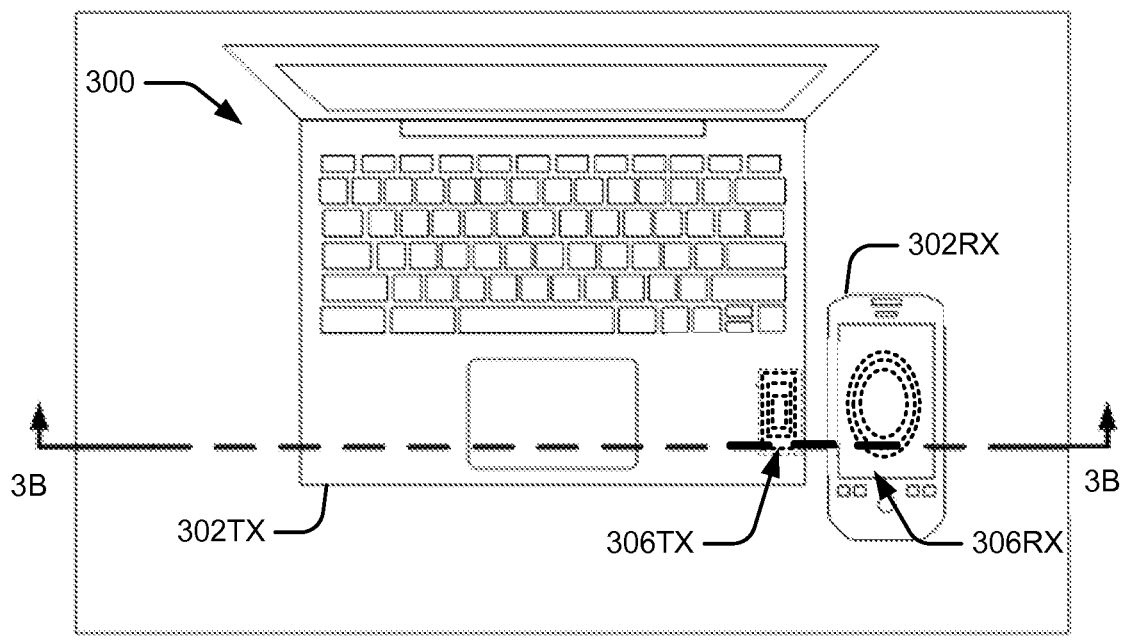
FIG. 3A is a top plan view of a pair of devices.
Figure 3B:
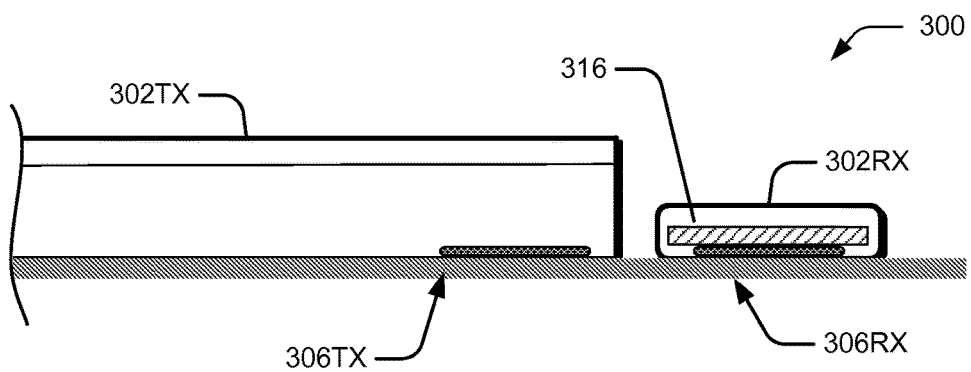
FIG. 3B is a schematic view of transmission and reception coils of a pair of devices.

Nevertheless, embodiments provide systems characterized, in part, by coupling coefficients k designed with WPT and NFC functions in mind. Furthermore, in some embodiments, systems 300 possess coupling coefficients k that enable relatively higher power transmission efficiencies n for WPT functions and frequency ranges sufficiently broad for NFC functions. As is further disclosed herein, these coupling coefficients k depend on how much magnetic flux generated by the transmitting coil 206 penetrates the receiving coil 206 thereby inducing electrical current through that coil. While coupling coefficients k often depend on the geometry of the coils 206, their relative locations, and the number and location of surrounding objects, embodiments provide flux guides, flux shields, flux wrappers, etc. that influence (and sometimes increase) the coupling coefficients k at frequencies w such as those used in WPT and/or NFC functions. With reference now to FIGS. 3A and 3B, various considerations are disclosed.

FIG. 3A is a top plan view of a pair of devices. More specifically, FIG. 3A illustrates a system 300 which includes two devices $302_{TX}$ and $302_{RX}$. System 300 might arise when a user brings one of the devices 302 into close proximity with the other device 302 as suggested by near field coupling-related protocols. Indeed, one or the other device $302_{TX}$ might reside in a particular location for relatively long periods. In contrast, the other device $302_{RX}$ might be designed to be relatively more mobile and might reside in some location for relatively shorter periods. For instance, device $302_{TX}$ might be a laptop computer and device $302_{RX}$ might be a smart phone as illustrated by FIG. 3A.

Thus, system 300 generally arises as desired by the user or as it might otherwise happen that the devices 302 come into close proximity with each other. In many cases, though, users will want to use both devices 302 while they are in close proximity without constraints imposed by the ability of coils 306 within the devices to couple. Moreover, as is illustrated in FIG. 3A, the locations, orientations, etc. of transmitting and receiving coils $306_{TX}$ and $306_{RX}$ in the transmitting and receiving devices $302_{TX}$ and $302_{RX}$ might not facilitate use of both devices 302 while near field coupling-related functions are occurring. Indeed, to enable such functions, previously available systems 300 often require that receiving device $302_{RX}$ be place on top of the transmitting device $302_{TX}$ to at least partially align and overlap the coils $306_{RX}$ and $306_{TX}$.

In the scenario illustrated by FIG. 3A, the transmitting device $302_{TX}$ includes the transmitting coil $306_{TX}$ near its bottom and toward its front most, right corner. The receiving device $302_{RX}$ includes a coil $306_{RX}$ situated near its geometric center with portions of the receiving device $302_{RX}$ extending outwardly there from. To align and overlap the coils 306 therefore requires that the receiving device $302_{RX}$ be placed on or near the front, right corner of the transmitting device $302_{TX}$. However, in that position it blocks access to much of the keyboard of the transmitting device $302_{TX}$. It also leaves receiving device $302_{RX}$ prone to slipping off transmitting device $302_{TX}$ and in an awkward location for its use. That being said it might now be beneficial to turn to FIG. 3B.

FIG. 3B is a schematic view of transmission and reception coils of a pair of devices. Moreover, FIG. 3B illustrates that with the smaller of the two devices $302_{RX}$ the coil $306_{RX}$ happens to be positioned in close proximity to various components of the receiving device $302_{RX}$ as is often the case. These components, and particularly metallic components 316 such as batteries, PCBs, etc., can significantly interfere with coupling between the transmitting coil $306_{TX}$ and the receiving coil $306_{RX}$. Moreover, it is noted here that such situations can arise because of the often-felt desire to mechanically integrate the physical components of the devices 302 in small and/or thin housings or chasses.

Figure 4:
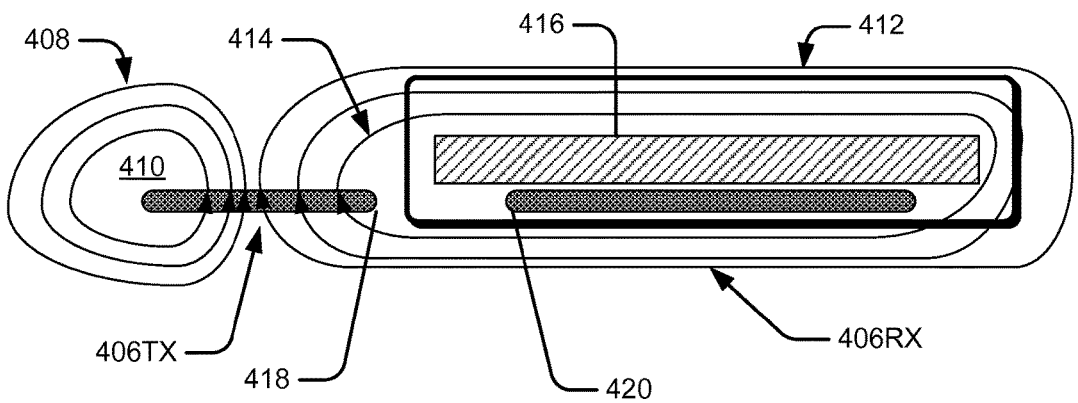
FIG. 4 illustrates a flux pattern associated with a pair of transmitting and receiving coils.

FIG. 4 illustrates a corresponding flux pattern associated with a pair of transmitting and receiving coils. FIG. 4 also illustrate the results of a simplified simulation of how metallic components 416 (and other objects) can divert flux 408 of a magnetic field 410 away from coils 406 in various devices such as thin electronic devices (not shown). However, it is seen in FIG. 4 that the corresponding devices are side-by-side each other. In the simplified simulation, transmitting and receiving coils $406_{TX}$ and $406_{RX}$ of typical thin devices were modeled in close enough proximity to one another so that WPT and NFC (non-limiting near field coupling) functions could occur according to the corresponding protocols. In addition, a typical metallic component 416 was modeled as a metallic box at a distance and relative orientation to the receiving coil $406_{RX}$ typically found in thin devices.

On the left side of FIG. 4, a generally undisturbed pattern of flux 408 is observed near the transmitting coil 406TX, as those skilled in the art will recognize. However, the presence of the metallic component 416 in the right side of the magnetic field 410 alters the magnetic field 410 and thus the flux in its vicinity. More specifically, near the center of the transmitting coil $406_{TX}$ (and at a relatively large distance from the metallic component 416) the flux 408 flows upwardly from the transmitting coil 406 and begins to arc over to the right in a more or less mirror image of the left side of the magnetic field 410. However, eddy currents (not shown) in the metallic component 416 generate their own magnetic fields (not shown) which influence diverted flux 412 to deviate from that mirror image of the magnetic field 410 associated with the left side of the transmitting coil $406_{TX}$. Indeed, under the influence of these eddy-current-induced magnetic fields, the diverted flux 412 tends to flow around the metallic component 416 until it reaches the far end of the metallic component 416. Whereupon, the diverted flux 412 arcs downwardly and thence around the surface of the metallic component 416 opposite the transmitting coil $406_{TX}$ until it returns to the vicinity of the transmitting coil $406_{TX}$. At that general location, the influence of the eddy currents in the metallic component 416 begin to fade and the diverted flux 412 returns to the center of the transmitting coil $406_{TX}$ as illustrated. Thus, the metallic component 416 therefore lowers the apparent inductance of the receiving coil $406_{RX}$ and weakens its coupling with the transmitting coil $406_{TX}$. Of course, as with many devices 402, many metallic components 416 could be in the proximity of either or both coils 406.

In the meantime, the flux 414 of the relatively strong field generated at the edge 418 of the transmitting coil $406_{TX}$ far from the receiving coil $406_{RX}$ (hereinafter "flux 414") follows a similar pattern but on a smaller scale. At the edge 418 of the transmitting coil $406_{TX}$ adjacent to the edge 420 of the receiving coil $406_{RX}$ much of the flux 414 departing the edge 418 encounters the metallic component 416 (or the influence of its eddy currents) and diverts around the same. Thus, the metallic component 416 also blocks and/or limits much of the flux 414 that might have otherwise reached and perhaps have even penetrated the receiving coil $406_{RX}$.

As a result, little or no flux 408, diverted flux 412, or flux 414 can reach much less penetrate the receiving coil $406_{RX}$. Accordingly, the coupling coefficient k of such an arrangement tends to be low perhaps being as little as 0.016 (or worse) with a correspondingly limited system level quality factor Q. With such a low coupling coefficient k, power transfer efficiencies n drop to such low levels that little if any power can be transferred from the transmitting coil $406_{TX}$ to the receiving coil $406_{RX}$. Likewise, the low-efficiency coupling of these coils 406 (in such situations) creates a correspondingly weak electric signal in the receiving coil $406_{RX}$. Thus, if information was encoded into the electrical current driving the transmitting coil $406_{TX}$ it becomes unlikely and/or difficult to recover that signal and hence the information appearing in the electrical current induced in the receiving coil $406_{RX}$. As mechanically integrated into the receiving device $402_{RX}$, metallic components 416 therefore inhibit both WPT and NFC functions. Embodiments, which improve the coupling coefficients k of various side-by-side systems, are disclosed with reference to FIG. 5. Embodiments do so, at least in part, by collecting and concentrating more of the flux emanating from 406TX in FIG. 4. Doing so will likely increase the quality factors Q, coupling coefficients k, and efficiencies n of embodiments.

Figure 5:
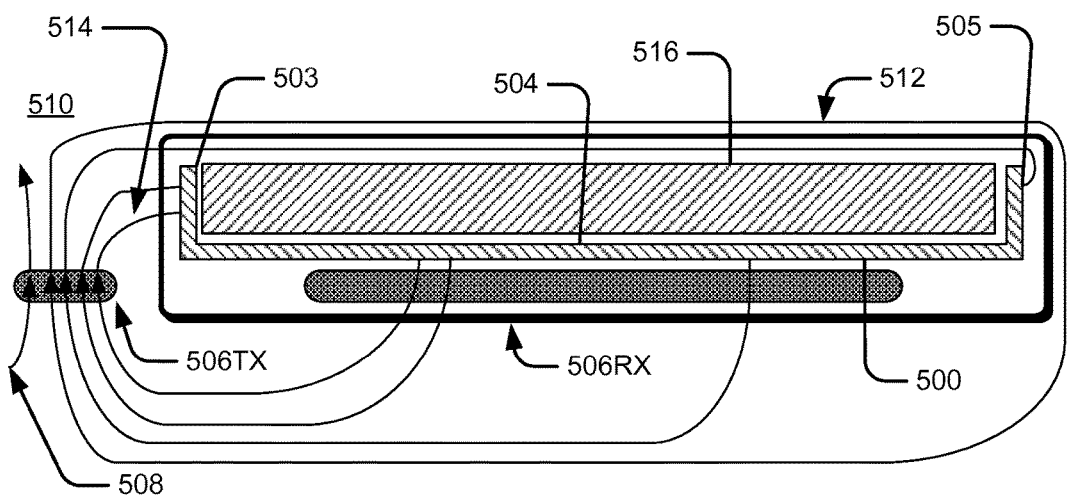
FIG. 5 illustrates a flux pattern of another pair of transmitting and receiving coils.

FIG. 5 illustrates another pair of transmitting and receiving coils. FIG. 5 also illustrates a ferrite wrapper 500 in accordance with various embodiments. As is disclosed further herein, the ferrite wrapper 500 acts as a flux guide to guide flux into the receiving coil $506_{RX}$ (and/or out of transmitting coils $506_{TX}$) in close proximity to metallic components 516. Antenna assemblies of the current embodiment capture more of the left-to-right flowing flux discussed with reference to FIG. 4 thereby increasing pertinent quality factors Q, coupling coefficients k, and effeciencies n. Moreover as flux guides, ferrite wrappers 500 of embodiments need not be made from ferrite. Rather, they can be made of any material having suitable properties such as electrical conductivity/resistivity, magnetic permeability, etc. As a result, embodiments provide devices and systems with coupling coefficients k, efficiencies n, and quality factors Q suitable for side-by-side near field coupling (WPT and NFC) functions.

In the current embodiment, the ferrite wrapper 500 defines three portions: a planar portion 504 and shield portions 503 and 505. In alternative embodiments, the ferrite wrapper 500 may have just two portions, such a planar portion 504 and one of the shield portions 503 or 505. In some embodiments, the ferrite wrapper 500 is made of one continuous sheet of ferrite and is formed into a channel or bowl shape with the shield portions 503 and 505 forming approximately 90-degree angles with the adjoining planar portion 504. However, other angles and configurations are envisioned and within the scope of the disclosure. For instance, ferrite wrappers of some embodiments only have one shield portion 503 or 505 although some embodiments provide ferrite wrappers 500 with as many shield portions as might be desired to correspond to the shape of the metallic component(s) 516 with which it will cooperate as disclosed further herein. In some embodiments, the ferrite wrappers 500 are made from discrete, separate shield portions 503 and 505 and planar portions 504.

With continuing reference to FIG. 5, in the current embodiment, the receiving coil $506_{RX}$ is illustrated as being positioned toward the bottom or base of the receiving device (not shown). Of course, terms used herein such as "bottom," "front," "back," "right," left," "base," "bottom," "top," etc. merely indicate arbitrarily chosen surfaces of the devices and are not intended to limit the disclosure to any particular orientation or orientations of such devices. The surfaces may be two adjoining surfaces, such as the base (or bottom) of the housing and the side of the housing. Moreover, while FIG. 5 illustrates the ferrite wrapper 500 being positioned in a receiving device, no such limitation is implied. Indeed, ferrite wrappers 500 can be positioned in transmitting devices and such embodiments are within the scope of the disclosure.

With reference still to FIG. 5, the ferrite wrapper 500 of the current embodiment is generally adjacent to the receiving coil $506_{RX}$. More particularly, the planar portion 504 of the ferrite wrapper 500 is generally adjacent to and aligned with the receiving coil $506_{RX}$ or at least a portion thereof. Moreover, planar portions 504 of some embodiments correspond in shape and size to the shape and size of the receiving coil $506_{RX}$. However, planar portions 504 with shapes, sizes, etc. different from the shapes, sizes, etc. of the receiving coil $506_{RX}$ are envisioned and are within the scope of the disclosure. It is also noted here that the term "generally planar" indicates that the pertinent object is generally flat although it might have some irregularities associated therewith. For instance, an offset of a few millimeters between one portion of a generally planar object and another portion of that same object would not render it non-planar. Nor would a small amount of curvature, surface irregularities, etc. of the sort typically found in available "flat" coils and/or PCBs and particularly as these objects might be mechanically integrated into thin devices.

That being said, in the current embodiment, the metallic component 516 is positioned in at least one angle of the ferrite wrapper 500 and can therefore said to be "wrapped" by the same. In accordance therewith, the shield portions 503 and 505 extend at least partially along the corresponding edges of the metallic object. Thus, FIG. 5 illustrates ferrite wrapper 500 wrapping at least partially around the metallic component 516. While FIG. 5 illustrates ferrite wrapper 500 conforming closely to the shape of the metallic component 516, no such limitation is implied. Instead, embodiments include ferrite wrappers 500 which allow gaps between themselves and metallic components 516 and which do not correspond in shape, or conform to, the metallic components 516. Even with such deviations, the ferrite wrapper 500 of the current embodiment would "wrap" the metallic component 516 as is meant within the current disclosure. In the current embodiment, though, the metallic component 516 and the receiving coil $506_{RX}$ sandwich the planar portion 504 of the ferrite wrapper 500 between themselves perhaps with some gaps there between. In addition, FIG. 5 illustrates the resulting assembly positioned in a side-by-side orientation relative to transmitting coil $506_{TX}$.

As is disclosed further herein (with reference to FIG. 4), the eddy currents in the metallic component 516 usually do not significantly affect the magnetic field 510 in the volume illustrated on the left side of FIG. 5. However, on the side of the transmitting coil $506_{TX}$ toward the receiving coil $506_{RX}$, the magnetic field 510 behaves differently with the ferrite wrapper 500 in place than as disclosed with reference to FIG. 4. While some of the diverted flux 512 and/or flux 514 still flows around the metallic component 516, some of the diverted flux 512 and flux 514 encounter the shield portion 503 on the side of the ferrite wrapper 500 positioned toward the transmitting coil $506_{TX}$.

Because of the relatively high magnetic permeability of the ferrite (or other material) from which the ferrite wrapper 500 is made, at least some of the diverted flux 512 and/or flux 514 impinging on the shield portion 503 flows into the shield portion 503 of the ferrite wrapper 500. Furthermore, once therein, that portion of the diverted flux 512 and/or flux 514 tends to follow the shape of the ferrite wrapper 500 from the shield portion 503 (where it entered) and into the planar portion 504. Thus, the shield portion 503 of the ferrite wrapper 500 blocks that portion of the diverted flux 512 and/or flux 514 from encountering the metallic component 516 and therefore shields the metallic component(s) 516 behind it. Furthermore, that portion of the diverted flux 512 and/or flux 514 that enters the shield portion 503 (and any flux that enters the planar portion 504 through its edge facing the transmitting coil $506_{TX}$) becomes concentrated in and flows along the planar portion 504 of the ferrite wrapper 500. But, it is believed that much more of that flux in the planar portion 504 is able to flow there from in a direction (downwardly) enabling it to penetrate the coil $504_{RX}$ (which is in relatively close proximity to the planar portion 504).

It is also believed that the foregoing effect is due at least in part to the shape of the ferrite wrapper 500, which facilitates the concentrated flux flowing in the planar portion 504 penetrating the receiving coil $506_{RX}$. As a result, more of that flux couples with the receiving coil $506_{RX}$ and induces electrical current therein then would otherwise have been the case without the ferrite wrapper 500. The coupling coefficient k, efficiency n, and system level quality factor Q of the overall system (the transmitting coil $506_{TX}$ and receiving coil $506_{RX}$) increases accordingly.

Moreover, in embodiments with more than one shield portions 503 and 505, additional coupling can be achieved between the transmitting and receiving coils $506_{TX}$ and $506_{RX}$. For instance, near the shield portion 505 on the side of the ferrite wrapper 500 opposite the transmitting coil $506_{TX}$, additional coupling can be achieved. In this situation, some of the diverted flux 512 will begin to arc downward as it flows passed the corresponding corner of the metallic component 516. Some of that diverted flux 512 will continue downwardly passed the shield portion 505. However, some of that diverted flux 512 will continue turning back toward the shield portion 505 and (because of its relatively high magnetic permeability) will enter therein. Again, the ferrite wrapper 500 guides that portion of the diverted flux 512 into the generally planar portion 504 of the ferrite wrapper 500 where it can couple with the receiving coil $506_{RX}$.

Embodiments also provide systems in which both the transmitting coils $506_{TX}$ and receiving coils $506_{RX}$ have ferrite wrappers 500 associated therewith. Indeed, in some embodiments, only the transmitting coil $506_{TX}$ has a ferrite wrapper associated with it. Moreover, it is envisioned that instead of a coil antenna being used for the transmitting antenna, a quarter torus antenna may be employed.

No matter the type of antenna used as the transmitting antenna, the flux flowing through the portion of the planar portion 504 of the ferrite wrapper 500 nearest the transmitting coil $506_{TX}$ and the flux flowing through the opposite side of the planar portion 504 will have different directions. However, the directions of the flux in each of those portions of the planar portion 504 will (because of the mirrored geometry involved) correspond to the desired flux direction associated with the corresponding side of the receiving coil $506_{RX}$. Accordingly, the effects of having another shield portion 505 of the ferrite wrapper 500 include further increasing the coupling of the coils $506_{TX}$ and $506_{RX}$, the coupling coefficient k, the efficiency n, and the system level quality factor Q. WPT and NFC functions (as well as other near field coupling-related functions) should therefore be facilitated by embodiments. It is noted here that simulations of such systems showed that such effects should result. Indeed, improvements in coupling coefficients k, efficiencies n, and system level quality factors Q ranged by factors between about 2.5 and about 3.0 for typical thin devices 500 with flux guides 500 with thicknesses of between 1 and 3 mm and with coils simulated at center-to-center distances between 45 mm and 65 mm.

Some embodiments provide portable devices, which include housings, metallic components, coils, and flux wrappers. Typically, the metallic components are positioned within the housing and define at least two surfaces. The coils define generally planar portions, which are positioned in the housings and in close proximity to the metallic components. In the current embodiment, portions of the flux wrappers are positioned between the metallic components and the generally planar portions of the coils. In addition, the flux wrappers wrap at least partially around each of the two surfaces of the metallic components.

In some embodiments, the portable devices are configured to be positioned side-by-side with other devices to perform near field coupling functions including wireless power transfer (WPT), near field communication (NFC), and a combination thereof. These portable devices can be (among others) mobile phones, cellular phones, smartphones, personal digital assistants, tablet computers, netbooks, notebook computers, laptop computers, multimedia playback devices, (digital) music players, (digital) video players, navigational devices, or digital cameras. In addition, the devices can be charging mats.

Moreover, in some embodiments, the coils can be configured to receive flux from fields of transmission coils. Alternatively, in some embodiments, the coil can be configured to generate fields (for coupling flux to receiving coils). These coils can be configured to resonate at either 6.78 MHz and 13.56 MHz or other frequencies. Various embodiments provide flux wrappers, which are continuous and/or made of ferrite. In addition, or in the alternative, the flux wrappers can wrap at least partially third surfaces of the metallic components.

Some embodiments provide portable devices, which include housings, metallic components, coils, and flux guides. Typically, the metallic components are positioned within the housing and define first and second surfaces. The coils are positioned in the housings and in close proximity to the metallic components and define generally planar portions. Furthermore, the flux guides define generally planar flux guide portions positioned between the generally planar coil portions and the first surfaces of the metallic components. These flux guides also define shield portions positioned adjacent to the second surfaces of the metallic components.

Various embodiments therefore provide more user-friendly information and power sharing arrangements. For instance, embodiments improve the ability of electronic devices to perform WPT and NFC functions with fewer data dropouts, with fewer communication interruptions, with increased efficiency, etc. Some embodiments, moreover, allow for side-to-side bumping of devices for communicating information between the devices. For instance, embodiments allow side-to-side bumping for peer-to-peer NFC-based information sharing between tablet computing devices, which would otherwise be ergonomically awkward if users had to comply with back-to-back bumping. In the alternative, or in addition, some embodiments allow for side-by-side power transfers as shown in FIG. 1B among other capabilities. For instance, embodiments provide demonstrated side-by-side wireless charging of smart phones from notebook computers.

Figure 6:
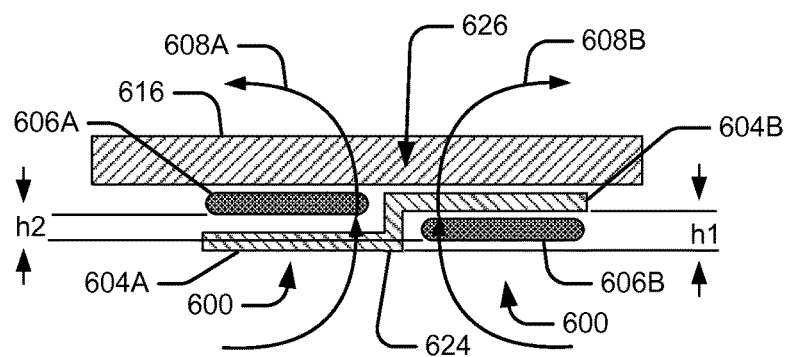
FIG. 6 illustrates an interleaved antenna assembly.

FIG. 6 illustrates an interleaved antenna assembly. As is disclosed further herein with reference to at least FIG. 4, inefficient coupling of the coils of conventional devices limits near field coupling related-functions. FIG. 6 illustrates flux guide 600, which can improve coupling for such near field coupling related-functions by concentrating flux, and guiding it through the coil along a coherent path. The flux guide 600 includes two generally planar guide portions 604A and 604B in addition to an offsetting guide portion 624. The offsetting guide portion 624 provides an offset h1 between the planar guide portions 604A and 604B. The flux guide 600 interleaves with two generally planar coil portions 606A and 606B of a coil 606. More specifically, the coil 606 mounts to a PCB (not shown) which defines another offset h2 and an aperture 626.

In the current embodiment, aperture 626 and offsetting guide portion 624 of the flux guide 600 are positioned such that a significant portion of the flux penetrating the coil is confined within the flux guide and routed through the coil along a coherent path. For a planar spiral coil, this means passing through the coil assembly within the innermost turn. By way of example, FIG. 6 illustrates this with a momentary snapshot of an AC field. The direction of flux in flux guide portion 604A is substantially from left to right in accordance to the field illustrated by 608A; the direction of flux in the offsetting guide portion 624 is substantially from bottom to top according to field lines 608A and 608B; and the direction of flux in flux guide portion 604B is substantially left to right according to field line 608B. In this manner, the flux guide routes flux through coil 606A and B in coherent direction. Often, the optimal position for the offsetting guide portion of the flux guide happens to be near the center of the coil 606. But that is not always the case. For instance, coil 606 might have an irregular and/or asymmetric, shape and/or one or more magnetic fields that the coil might encounter might also have irregularities associated therewith (or otherwise be asymmetrical). Nonetheless, FIG. 6 illustrates a generally symmetric flux guide 600 with generally planar flux guide portions 604A and 604B beginning approximately at the centrally located aperture 626 and extending outwardly to either side. Likewise, the planar coil portions 606A and 606B also begin at approximately the aperture 626 and extend outwardly there from.

Interleaved embodiments (see for instance, FIGS. 6-11) are expected to be relatively effective at preventing eddy currents from being generated in metallic objects 616 since they prevent large currents from circulating in the metal. Since eddy currents in the metallic objects 616 tend to decrease pertinent quality factors Q, coupling coefficients k, and efficiencies w, such embodiments are expected to improve such design/performance criteria.

Although the flux guide 600 is described above and illustrated in FIG. 6 as having two offset planar guide portions 604A and 604B with the offsetting guide portion 624 connecting them, other implementations may be shaped differently but yet retain the overall general planar arrangement and functionality. For example, in another implementation, the three portions (e.g., two planar guide portions and offsetting guide portion) may be part of a single sheet where all portions are within the same plane. This solo-plane sheet may be inserted through the aperture 626 between coil portions 606A and 606B of the coil 606. In one implementation, the solo-plane sheet may be arranged horizontally, which would cause the portions 606A and 606B to be offset from each other. In another implementation, the solo-plane sheet may be arranged askew from the horizontal, which would allow the portions 606A and 606B to be arranged horizontal or nearly so (i.e., without any offset or with little offset). Moreover, the shape of the particular offsetting guide portion 624 shown in FIG. 6 does not limit the disclosure. While FIG. 6 illustrates offsetting guide portion 624 having an overall stair shape, it is noted here that it could be "S" shaped and/or continuous (or smooth) without departing from the scope of the disclosure.

The coil 606 and flux guide 600 therefore define an interleaved antenna assembly. The interleaved antenna assembly can be positioned adjacent to one or more metallic components 616 in a device so that diverted flux (of one type or another) can be gathered and guided to the planar coil portions 606A and 606B by the flux guide 600.

Figure 7:
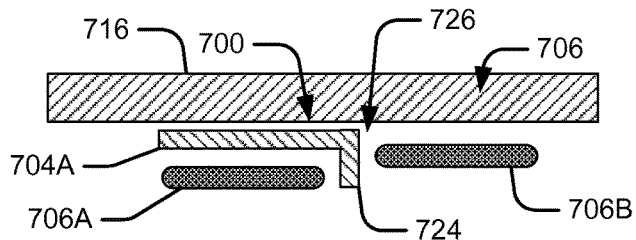
FIG. 7 illustrates another interleaved antenna assembly.

FIG. 7 illustrates another interleaved antenna assembly. As shown, the particular flux guide 700 only includes one generally planar guide portion 704A and an offsetting guide portion 724. That guide portion 724 is positioned within an aperture 726 formed between the coil 706.

Partially interleaved antenna assemblies 700 of the current embodiment might find use when some improvement in system-level performance is desired but increasing the thickness of the overall device is not desired.

Moreover, as those skilled in the art will appreciate, flux guides 700 and flux guides 500 (see FIG. 5) with only one shield portion 503 or 505 share a common "L" shaped configuration. As such, and depending on the length of the offsetting guide portion 724 and/or shield portion 503 and/or 505, it is envisioned and within the scope of the disclosure that such flux guides can be used. In either case, flux guides 700 of embodiments might enhance the ability of coils 706 to couple with magnetic fields despite the presence of metallic components 716

Figure 8:
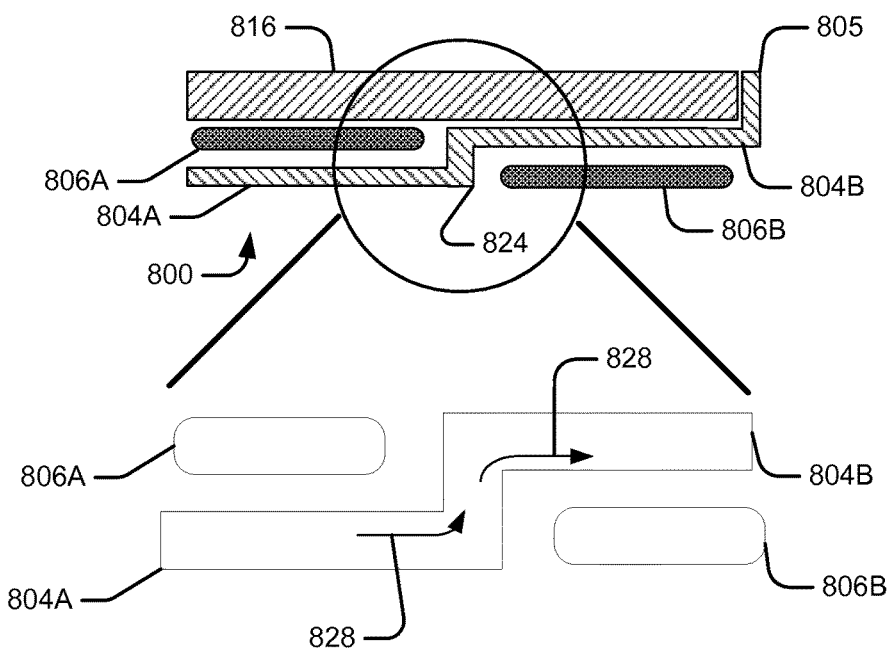
FIG. 8 illustrates an interleaved antenna assembly including a guide extension.

FIG. 8 illustrates an interleaved antenna assembly including a guide extension. The flux guide 800 of FIG. 8 includes two planar guide portions 804A and 804B and is shown in conjunction with a coil 806 having an offset as in FIG. 6. Moreover, flux guide 800 includes a guide extension portion 805, which serves to gather additional flux from the magnetic field(s) in which the coil 806 is situated and guides it to one or both planar guide portions 804A and 804B. As such, it might be desirable for the guide extension portion 805 to cover as much of the side of the metallic object 816 as is practicable within the constraints imposed by mechanically integrating the interleaved antenna assembly of the current embodiment into a housing or chassis of a device. Of course, the guide extension portion 805 could extend across just a portion of the metallic component 816 or even beyond it as might be desired. In any case, the guide extension portion 805 will likely increase the coupling coefficient k, quality factors Q, power transfer efficiencies n, etc. of systems involving such assemblies by more effectively routing flux near the coil, thereby increasing coil-coil coupling, k.

Indeed, interleaved antenna assemblies with one guide extension portion 805 were compared against non-interleaved antenna assemblies with one guide shield portion 505 (see FIG. 5). Note that the guide extensions (or shield portions) were both on the side of the respective metallic components 516 and 816 opposite the transmitting antenna. The simulations revealed, that for typical thin device configurations, the interleaved antenna assemblies of FIG. 8 exhibited approximately 13% to approximately 38% higher power transfer efficiencies, n, than the non-interleaved antenna assemblies of FIG. 5.

As with the other interleaved embodiments, the current embodiment concentrates flux within the planar guide portion 804A. That flux 828 then flows through the offsetting guide portion 824, the other planar guide portion 804B and then up through the extension 805 and out there from and away from the metallic component 816. As a result, the metallic component 816 senses less current in its vicinity and the eddy currents there in are expected to decrease in a corresponding manner. Accordingly, it is believed that interleaved antenna assemblies according to embodiments of the current disclosure will likely improve the coupling of coils 806 to various magnetic fields. Moreover, they can do so even in the presence of metallic components 816. Indeed, simulations have revealed that significant increases in power transfer efficiencies can be expected with interleaved antenna assemblies of the current embodiment over conventional antennas.

Figure 9:
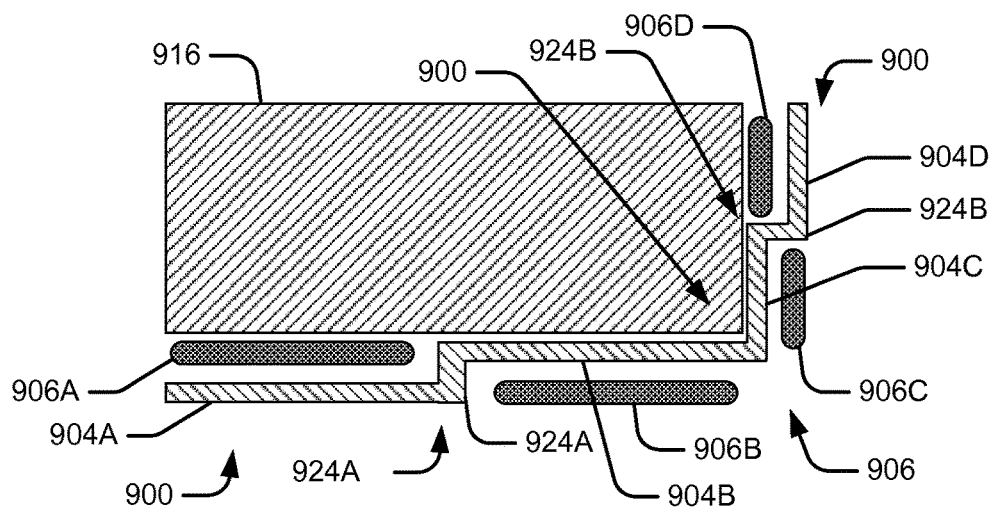
FIG. 9 illustrates an interleaved antenna assembly including a pair of receiving coils.

FIG. 9 illustrates an interleaved antenna assembly including a pair of receiving coils. Antenna assemblies of the current embodiment also increase concentrate the flux flowing through each of the coil elements 906 A, B, C, and D, improving the pertinent quality factors Q, coupling coefficients k, and efficiencies n of systems built in accordance therewith. More specifically, the device of the current embodiment includes a pair of planar coil portions 906A and 906B (forming one coil or sub-coil) on one side of a metallic component 916. Adjacent to an adjoining side of the metallic component 916, the interleaved coil assembly includes another pair of planar coil portions 906C and 906D (forming another coil or sub-coil). These additional planar coil portions 906C and 906D communicate with the other planar coil portions 906A and 906B and serve to couple with flux near the adjoining side of the metallic component 916. Together, planar coil portions 906A, 906B, 906C, and 906D can be considered as one coil if desired since they all electrically communicate with one another. Thus, the coil of the current embodiment will couple better with other coils than if it only had planar coil portions 906A and 906B. Interleaved antenna assemblies of the current embodiment can be employed in devices with space alongside their metallic components 916 and/or those devices in which the device envelope can be expanded in a corresponding direction. In the alternative, or in addition, the size of the coil 906 could be reduced to accommodate the interleaved flux guide 904 while still achieving overall improved coupling.

In addition to the additional planar coil portions 906C and 906D, devices of the current embodiment further includes planar guide portions 904C and 904D interleaved with these planar coil portions 906C and 906D. Again, an offsetting guide portion 924B (in addition to offsetting guide portion 924A) provides continuity between the planar guide portions 904C and 904D such that they can guide flux to the planar coil portions 906C and 906D. It is noted here that planar guide portions 904A, 904B, 904C, and 904D can be formed integrally with each other or can be bonded together in such a manner that flux can flow through the flux guide 900. For instance, flux guide 900 could be formed from a continuous sheet of ferrite. Of course, the current embodiment also provides an aperture 926B (in addition to aperture 926A) in the coil 906 through which offsetting guide portion 924B passes. While FIG. 9 illustrates a one-to-one correspondence between the various planar portions of the coil 906 and the various planar portions of the flux guide 900, no such correspondence is required for the practice of embodiments. For instance, embodiments include differing numbers of these planar portions are within the scope of the disclosure.

Figures 10A, 10B:
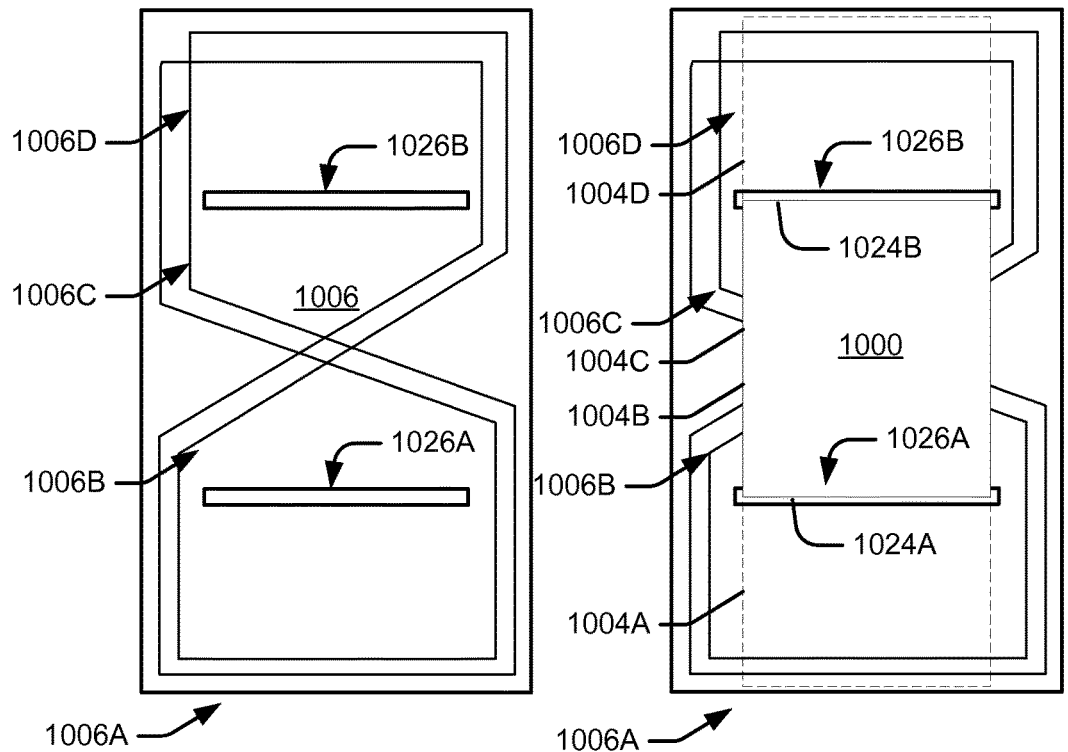
FIGS. 10A and 10B illustrate top plan views of an interleaved antenna assembly.

As noted previously, planar coil portions 906C and 906D and planar coil portions 906A and 906B electrically communicate with each other. However, in the current embodiment, these pairs of planar coil portions have an orthogonal relative orientation. As a result, according to the "right-hand rule" relationship between current and flux direction, the flux that might couple with one pair of planar coil portions 906A and 906B will induce current in the overall coil 906, which opposes the current induced in the other pair of planar coil portions 906C and 906B in some configurations. Moreover, the coupling between antennas might be low for a number of reasons such as their overall orientation, nearby metallic components, etc. However, as is disclosed further herein, FIGS. 10A and 10B illustrate embodiments that alleviate such situations. Again, compared to conventional devices, interleaved antenna assemblies such as those illustrated by FIGS. 9 and 10 will likely increase system-level coupling coefficients k, quality factors Q, and power transfer efficiencies n in a variety of situations.

FIGS. 10A and 10B illustrate top plan views of an interleaved antenna assembly. The interleaved antenna assembly of FIGS. 10A and 10B illustrates that the coil 1006 of the current embodiment is configured in a "figure 8" shape. More specifically, planar coil portions 1006A and 1006B form one of the lobes of the figure 8 shape while planar coil portions 1006C and 1006D form the other lobe. As a result, despite the orthogonal orientation of the pairs of planar coil portions 1006A and 1006B and 1006C and 1006D (when folded around a metallic component 916 as shown in FIG. 9), the induced currents therein will superimpose constructively rather than destructively.

Moreover, FIG. 10A shows that the flat coil 1006 (or rather the PCB or other structure which carries it) defines two apertures 1026A and 1026B through which corresponding offsetting guide portions 1024A and 1024B pass when the flux guide 1000 and coil 1006 are assembled as shown by FIG. 10B. The flux guide 1000 of the current embodiment therefore defines four planar guide portions 1004A, 1004B, 1004C, and 1004D. These planar guide portions 1004A, 1004B, 1004C and 1004C interleave with the four planar coil portions 1006A, 1006B, 1006C, and 1006D as follows. For instance, in the current embodiment, the most proximal planar guide portion 1004A lies under or adjacent to one side of the coil 1006 (or planar coil portion 1006A). Offsetting guide portion 1024A is positioned in aperture 1026A so that both planar guide portions 1004B and 1004C lie on top of or adjacent to the other side of coil 1006 (or planar coil portions 1006B and 1006C respectively). Offsetting guide portion 1024B passes through aperture 1026B so that planar guide portion 1004D lies under or adjacent to planer coil portion 1006D. Thus, the flux guide 1000 and coil 1006 form an interleaved antenna assembly with some planar guide portions 1004A and 1004D on one side of the coil 1006 while other planar guide portions 1004B and 1004B are on the other side of the coil 1006.

The interleaving of the coil 906 and flux guide 900 can be accomplished by sliding one end of the flux guide 1000 through one of the apertures 1026A, 1026B and then sliding the other end of the flux guide 1000 through the other aperture 1026A or 1026B. Furthermore, as a comparison of FIGS. 9 and 10 reveals, the interleaved flux guide 1004 and coil 1006 can be folded through an appropriate angle (as shown approximately 90 degrees) to form an angled or "L" shaped structure. The interleaved antenna assembly (as configured into such an angled shape) can be positioned adjacent to adjoining sides of metallic components 1016. One of the effects of interleaved antenna assemblies of the current embodiment is that planar guide portions 1004A, 1004B, 1004C, and 1004D guide flux to corresponding planar coil portions 1006A, 1006B, 1006C, and 1006D thereby enhancing coupling between coil 1006 and various magnetic fields.

Figure 11:
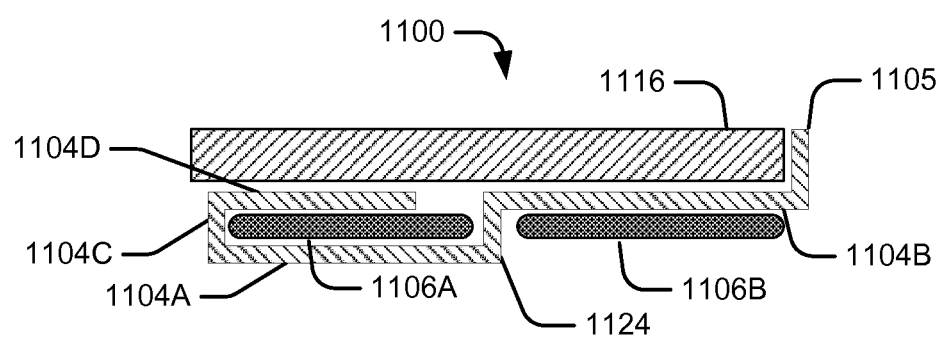
FIG. 11 illustrates an interleaved antenna assembly including a partial "S" shaped flux guide.

FIG. 11 illustrates an interleaved antenna assembly including a partial "S" shaped flux guide. More specifically, the interleaved antenna assembly 1100 of FIG. 11 includes a pair of planar coil portions 1106A and 1106B as well as interleaved planar guide portions 1104A and 1104B. The interleaved antenna assembly 1100 also includes a guide extension 1105 and an offsetting guide portion 1124. However, it also includes planar guide portions 1104C and 1104D which, together with planar guide portion 1104A and offsetting guide portion 1124 generally enclose planar coil portion 1106A. Moreover, as illustrated by FIG. 11, the planar guide portions 1104A, 1104B, 1104C and 1104D and the offsetting guide portion 1124 form a partial "S" shape. The current interleaved antenna assembly 1100 is expected to capture and route most, if not all of the left-to-right flowing flux from the left set of coil turns to the right set of coil turns thereby improving the amount of that flux captured as compared to conventional systems. Accordingly, improved quality factors Q, coupling coefficients k, and efficiencies n are expected to flow from the current embodiment.

Thus, embodiments provide devices exhibiting increased coupling coefficients k, quality factors Q, power transfer efficiencies n, etc. These features enable improve near field coupled-related functionality even when devices are bumped or placed in side-by-side orientations. Indeed, even compared to conventional systems using high volume antennas, illustrative embodiments improve power transfer efficiencies by between approximately 13% and approximately 38%. Furthermore, embodiments provide such enhanced functionality while mechanically integrating with small form factor and/or thin devices. Moreover, depending on the fabrication techniques employed, embodiments can be built into integrated circuits (ICs) and/or micro-machined electro-mechanical (MEMS) devices. Indeed, it is envisioned and within the scope of the current disclosure that interleaved antenna assemblies of various embodiments can be fabricated using semi-conductor fabrication techniques currently available as well as those yet to be developed.

Some embodiments provide antenna assemblies, which include interleaved coils and flux guides. More particularly, in the current embodiment, the coils are mounted on a printed circuit board and define a location where the flux associated with the coil reverses direction. In addition, the coils define two generally planar coil portions and an aperture located approximately at the location of the flux reversal. These planar coil portions are offset from one another in a direction generally perpendicular to themselves. Moreover, they begin at approximately the location of the flux reversal. The flux guides are made from a sheet of ferrite and define two generally planar guide portions and an offsetting portion. The offsetting portion is between the planar guide portions and is positioned in the aperture at the flux reversal location. Each planar guide portion is adjacent to one of the planar coil portions while the offsetting portion is generally perpendicular to the planar guide portions and the planar coil portions.

Various embodiments provide antenna assemblies with coils and flux guides. The coils define generally planar coil portions and locations where the flux associated with the coils reverses directions. The flux guides define generally planar guide portions and are interleaved with the coil at the location of the flux reversal. In some embodiments, the flux guide is made from a continuous sheet of ferrite. In some embodiments, the coil and the flux guide each define second generally planar portions, which are adjacent to each other. Moreover, these second planar portions can be on opposite sides of the coil from one another.

Antenna assemblies of some embodiments also include extensions of the coil and of the flux guide. In the case of the guide extension, it can extend beyond an edge of the coil, can be perpendicular to the coil (or a portion thereof), and can serve as a flux shield (or portion thereof) to gather flux and guide it to one or more of the guide planar portions. These extensions can be interleaved with each other at a second location where the flux associated with the antenna reverses directions. In addition, or in the alternative, the coil can be configured as a "figure 8." In some embodiments, the coil resonates at either 6.78 MHz and 13.56 MHz.

Moreover, some embodiments provide portable electronic devices with such interleaved antennas therein. Additionally these devices include housings and metallic components within those housings. Interleaved coils and flux guides are adjacent to the first surface of the metallic component in the current embodiment. Moreover, when the antenna includes second planar coil and guide portions, those second planar coil and guide portions can be adjacent to a second surface of the metallic object. Some embodiments provide guide extensions, which are adjacent to the second surface of the metallic object. Furthermore, the devices can be mobile phones, cellular phones, smartphones, personal digital assistants, tablet computers, netbooks, notebook computers, laptop computers, multimedia playback devices, digital music players, digital video players, navigational devices, digital cameras, charging mats, ultrabooks, mouses, keyboards, mobile hotspot producing devices, wireless hard drives, and/or wireless docking stations.

Various embodiments provide antenna assemblies, which include coils and flux guides. More specifically, in some embodiments, the coils each define at least one generally planar coil portion and a location where flux, which is (or will be) associated with the coil reverses directions. Additionally, the flux guide defines a generally planar portion and an offsetting portion. The generally planar guide and coil portions are generally adjacent to each other. In some embodiments, the planar guide and planar coil portions are interleaved at the offsetting portion whereas in some embodiments the offsetting portion extends away from the planar coil portion.

Although the subject matter has been disclosed in language specific to structural features and/or methodological acts, it is to be understood that the subject matter defined in the appended claims is not necessarily limited to the specific features or acts disclosed above. Rather, the specific features and acts described herein are disclosed as illustrative implementations of the claims.

What is claimed is:

1. An interleaved antenna assembly comprising:
   a coil configured to be mounted to a device, the coil includes a first and a second generally planar coil portions, and an aperture that is disposed in between the first and second generally planar coil portions; and
   a partial "S" shaped-flux guide made from a sheet of ferrite that is disposed to: cover and substantially wrap the first generally planar coil portion; pass through the aperture of the coil to form an offsetting guide portion of the partial "S" shaped-flux guide; and extending over to cover an upper planar portion of the second generally planar coil portion.

2. An antenna assembly as recited in claim 1, wherein the first and second generally planar coil portions are disposed at an offset position from one another, and the first and second generally planar coil portions extend in a direction perpendicular to the offsetting guide portion of the partial "S" shaped-flux guide.

3. An antenna assembly, as recited in claim 1, wherein the sheet of ferrite is a continuous sheet of ferrite.

4. An antenna assembly comprising:
   a coil that includes a first planar coil element and a second planar coil element;
   an aperture that is disposed across and between the first and second planar coil elements;
   a partial "S" shaped-flux guide that is interleaved with the coil through the aperture, wherein the partial "S" shaped-flux guide is disposed to: cover and substantially wrap the first planar coil element; pass through the aperture of the coil to form an offsetting guide portion of the partial "S" shaped flux guide; and extending over to cover an upper planar portion of the second planar coil element.

5. The antenna assembly as recited in claim 4, wherein the partial "S" shaped-flux guide is a continuous sheet of ferrite.

6. The antenna assembly as recited in claim 4, wherein the partial "S" shaped-flux guide defines a first and a second generally planar guide portions, the first and second planar guide portions being adjacent to the first and second planar coil elements, respectively.

7. The antenna assembly as recited in claim 6 wherein the first and second planar guide elements are on opposite sides of the coil.

8. The antenna assembly as recited in claim 4, further comprising a guide extension of the partial "S" shaped-flux guide extending beyond an edge of the coil.

9. The antenna assembly as recited in claim 8, further comprising a different aperture that is formed and disposed in between a third and fourth planar coil elements.

10. The antenna assembly as recited in claim 9, wherein the first, second, third, and fourth planar coil elements are integrated to form a single coil.

11. The antenna assembly as recited in claim 9, wherein the coils is configured as a figure 8.

12. The antenna assembly as recited in claim 8, wherein the guide extension is generally perpendicular to the coil.

13. The antenna assembly as recited in claim 4, wherein the partial "S" shape-flux guide is disposed in between a metallic component and the coil.

14. A portable electronic device comprising:
   a housing;
   a coil installed inside the housing, wherein the coil includes a first and a second generally planar coil elements, and an aperture that is disposed in between the first and second generally planar coil elements;
   a partial "S" shaped-flux guide made from a sheet of ferrite that is disposed to: cover and substantially wrap the first generally planar coil element; pass through the aperture of the coil to form an offsetting guide portion of the partial "S" shaped-flux guide; and extending over to cover an upper planar portion of the second generally planar coil element.

15. A portable electronic device as recited in claim 14, wherein the partial "S" shaped-flux guide is a continuous sheet of ferrite.

16. A portable electronic device as recited in claim 14, wherein the partial "S" shaped-flux guide defines a first and a second generally planar guide portions, wherein the first and the second planar guide portions being adjacent to the first and second planar coil elements, respectively.

17. A portable electronic device as recited in claim 16, wherein the first and second planar guide portions are on opposite sides of the coil.

18. A portable electronic device as recited in claim 14, further comprising a guide extension of the partial "S" shaped-flux guide portion extending beyond an edge of the coil.

19. A portable electronic device as recited in claim 18, further comprising a different aperture that is formed and disposed in between a third and fourth planar coil elements.

20. A portable electronic device as recited in claim 19, wherein the first, second, third, and fourth planar coil elements are integrated to form a single coil.

21. A portable electronic device as recited in claim 19, wherein the coil is configured as a figure 8.

22. A portable electronic device as recited in claim 18, wherein the guide extension is generally perpendicular to the coil.

23. A portable electronic device as recited in claim 16, wherein the coil has a resonate frequency selected from the group consisting of 6.78 MHz and 13.56 MHz.

* * * * *